United States Patent [19]

Al-Attar et al.

[11] Patent Number: 4,916,373

[45] Date of Patent: Apr. 10, 1990

[54] WINDSHIELD WASH AND WIPE AFTER WASH SYSTEM

[75] Inventors: Rafi A. Al-Attar, Troy; Annaliza O. Sollestre, Royal Oak; Michael P. Williams, Bloomfield Hills; Patrick D. Dean, Armada, all of Mich.

[73] Assignee: Chrysler Corporation, Highland Park, Mich.

[21] Appl. No.: 363,225

[22] Filed: Jun. 6, 1989

[51] Int. Cl.$^4$ ............................................. B60S 1/08
[52] U.S. Cl. ................................ 318/443; 318/DIG. 2; 15/250.17
[58] Field of Search ................ 318/443, 444, DIG. 2; 15/250.16, 250.17

[56] References Cited

U.S. PATENT DOCUMENTS

| | | | |
|---|---|---|---|
| 4,158,159 | 6/1979 | Orris et al. | 318/443 |
| 4,422,024 | 12/1983 | Itoh et al. | 318/443 |
| 4,451,768 | 5/1984 | Kohler et al. | 318/443 |
| 4,559,484 | 12/1985 | Hirano | 318/443 |
| 4,731,566 | 3/1988 | Takaishi | 318/444 |

Primary Examiner—Bentsu Ro
Attorney, Agent, or Firm—Wendell K. Fredericks

[57] ABSTRACT

A windshield wash and wipe after wash circuit responsive to any of a plurality of wash and wipe conditions causes a wiper arm and blade assembly to park with a high rate of consistency at an absolute park position out of the vision of the operator.

13 Claims, 5 Drawing Sheets

(Prior Art)

WINDSHIELD WASH AND WIPE AFTER WASH SYSTEM

BACKGROUND OF THE INVENTION

1. Field of the Invention

This invention relates to a windshield wiper control system and more particularly to a wipe-after-wash circuit for continuing wiping of the windshield after washing for a plurality of wipe cycles to dry the windshield and then to park the wiper blade and arm assembly in an absolute park storage location each time the circuit is employed with consistent accuracy.

2. Description of the Prior Art

After washing with wash fluid while wiping the windshield to wash it, the washing ceases and the wiper blades continue to wipe the windshield until all the fluid is removed, drying the windshield. Then, the blade and arm assembly is returned to a park storage location.

A problem exists with some systems in returning the wiper arm and blade assembly to a storage location below the visible regions of the windshield. Often, the wiper blade returns to a position just above storage on the windshield and very visible to the operator instead of off the windshield in the park storage location. This problem generally occurs because some automatic wiping circuits are improperly timed to fully return the wiper blades to an absolute park storage location and sometimes system power or environmental conditions interfere.

U.S. Pat. No. 4,731,566 of Takaishi dated Mar. 15, 1988 entitled "Intermittent Drive Controller For Windshield Wiper Motor" teaches a wipe-after-wash terminated by braking the wiper at the moment that the wiper motor pauses. A braking loop circuit stops the wiper motor at one revolution after a dwell-type motor switch changes from a voltage source terminal to a ground terminal. This system effectively stops the wiper blades in a park location but it appears that the one revolution of the motor may not totally clear the windshield of the wash solution.

Another wipe-after-wash circuit is described in U.S. Pat. No. 4,158,159 dated June 12, 1979 of Orris, et al. entitled "Electronic Circuit Controller For Windshield Drive Motor" and assigned to the present assignee. In this patent, a reversible two-speed, three-brush, permanent magnet field DC motor drives the wiper motor. After a wash pushbutton is released, a timing network provides power to a transistor drive circuit which causes the reversible motor to operate for one or two cycles before the wiper blade is returned to a park location. The park location occurs within a span of 0 to 40 degrees; the zero location equalling a fully parked wipe blade while within a 40 degree position stops the blades somewhere within the vision of the operator. The environmental conditions such as dryness of the windshield and the power conditions of the electrical system, which could provide operating voltages ranging from 9 volts to as high as a possible 24 volts, could effect the timing circuit. The wiper motor could be stopped somewhere in the region between zero and 40 degrees without any guarantee of the blades returning to the absolute park position at zero degree.

Realizing the various problems associated with returning the wiper blade to an absolute park position, a search for various other means to achieve an absolute park position which could be integrated into an existing wash and wipe system was initiated. This search resulted in improved wipe-after-wash system of the present invention.

SUMMARY OF THE INVENTION

The invention discloses an independent wash and wipe-after-wash circuit that may operate during all operating modes of the wiper system, namely, OFF, DELAY, LOW AND HIGH. In the OFF mode, this novel circuit operates simply by pressing the wash pushbutton. The wash fluid pump operates and the wiper blade wipes upon pushing the pushbutton; and upon releasing the button, an automatic circuit causes the wiper blades to wipe a plurality of oscillations before returning the blades to an absolute park position with the probability of occurrence of about 96 percent. The wipe-after-wash circuit includes a novel step-down timing circuit which improves the chances of parking the wiper blades at the absolute park position of zero degree.

BRIEF DESCRIPTION OF THE DRAWING FIGURES

FIG. 3-A through H are timing diagrams describing the operation of the step-down circuit employed to automatically operate the wiper motor after the wash pushbutton is released;

FIG. 6-A and B depict timing diagrams of the step-down circuit for a range of system voltages in conjunction with the motor switch reactions; and FIG. 7-A and B depict timing diagrams for the step-down circuit for a range of environmental conditions in conjunction with the motor switch reactions.

DETAILED DESCRIPTION OF A PREFERRED EMBODIMENT

Figure 1:
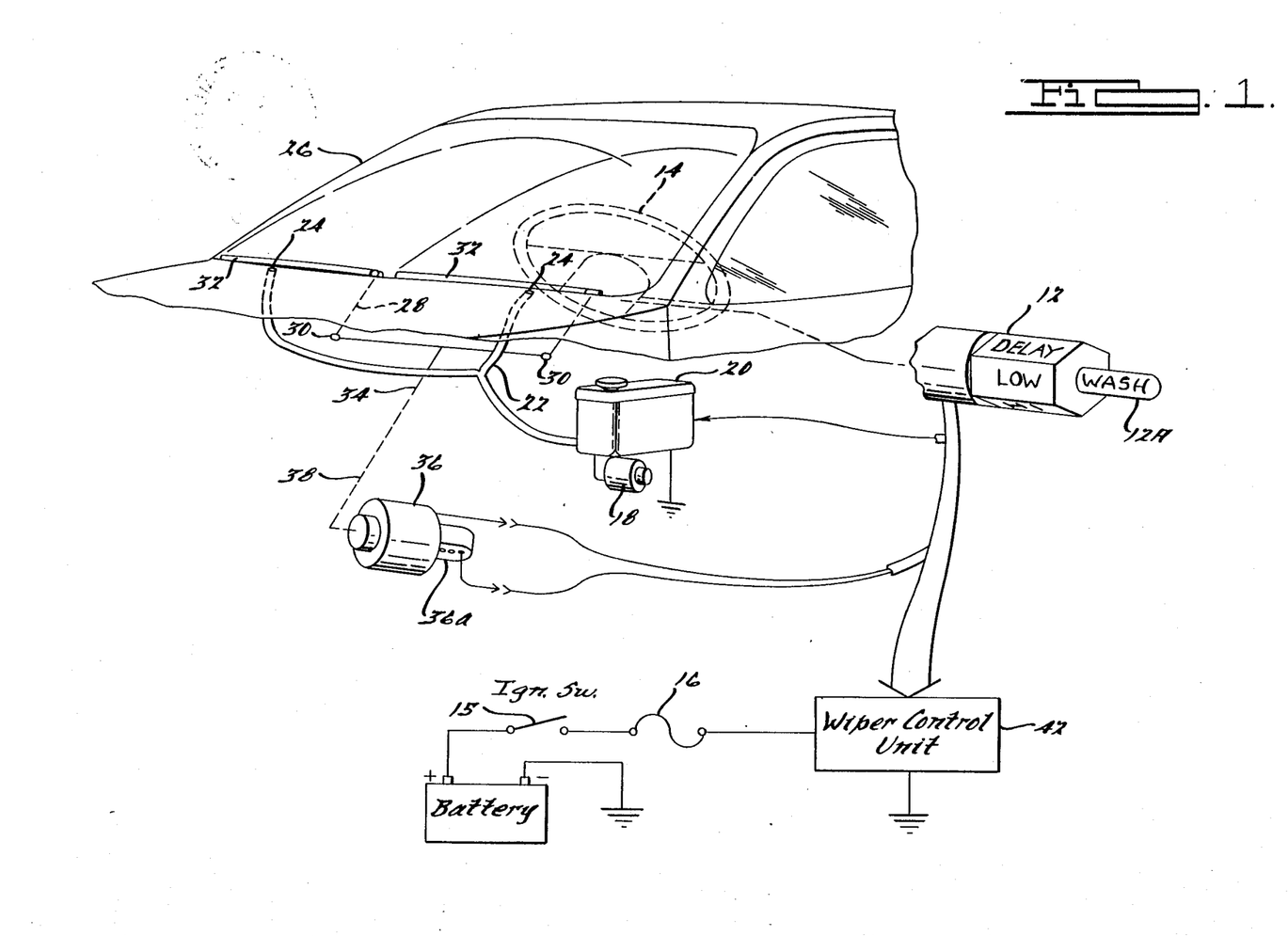
FIG. 1 illustrates in a partial pictorial, partial schematic diagram of a wiper control system that includes the independent and automatic pulse wipe feature.

FIG. 1 illustrates, in a partial pictorial, partial schematic diagram, a wiper control system 10 that includes an independent and automatic pulse wipe feature.

System 10 provides four operating modes; namely, OFF, DELAY, LOW and HIGH. A column switch 12 which may mount off the steering wheel column of steering wheel 14 or off a dashboard permits selecting the above modes. The first position places the system in the OFF mode; next provides an elongated slide contact for the DELAY or dwell wipe, with counterclockwise rotations reducing the delay time; LOW speed results at the next detent position and, finally, HIGH speed occurs at the full counterclockwise detent position.

In any wipe mode, pressing a wash pushbutton 12A completes a windshield washer and wiper circuit. The windshield wipers and the washer operate with the column switch mode circuits after turning an ignition switch 15 to the ACCESSORY or IGNITION position.

With the IGNITION switch on, power reaches system 10 through fuse 16. The washer circuit includes a wash fluid pump 18 mounted directly to a reservoir 20. Fluid, gravity fed from the reservoir, gets forced by pump 18 through rubber hoses 22 to the nozzles 24 which direct streams of fluid to windshield 26.

In addition to column switch 12, the wiper circuit includes left and right wiper arm and blade assemblies 28 which oscillate about left and right pivots 30 from a park position 32 over an arcuate path across windshield 26. A connecting link 34 permits a conventional two-speed, twobrush wiper motor 36 to drive both wiper arm and blade assemblies simultaneously by a drive link 38 connected between the wiper motor 36 and the connecting link 34.

Figure 2:
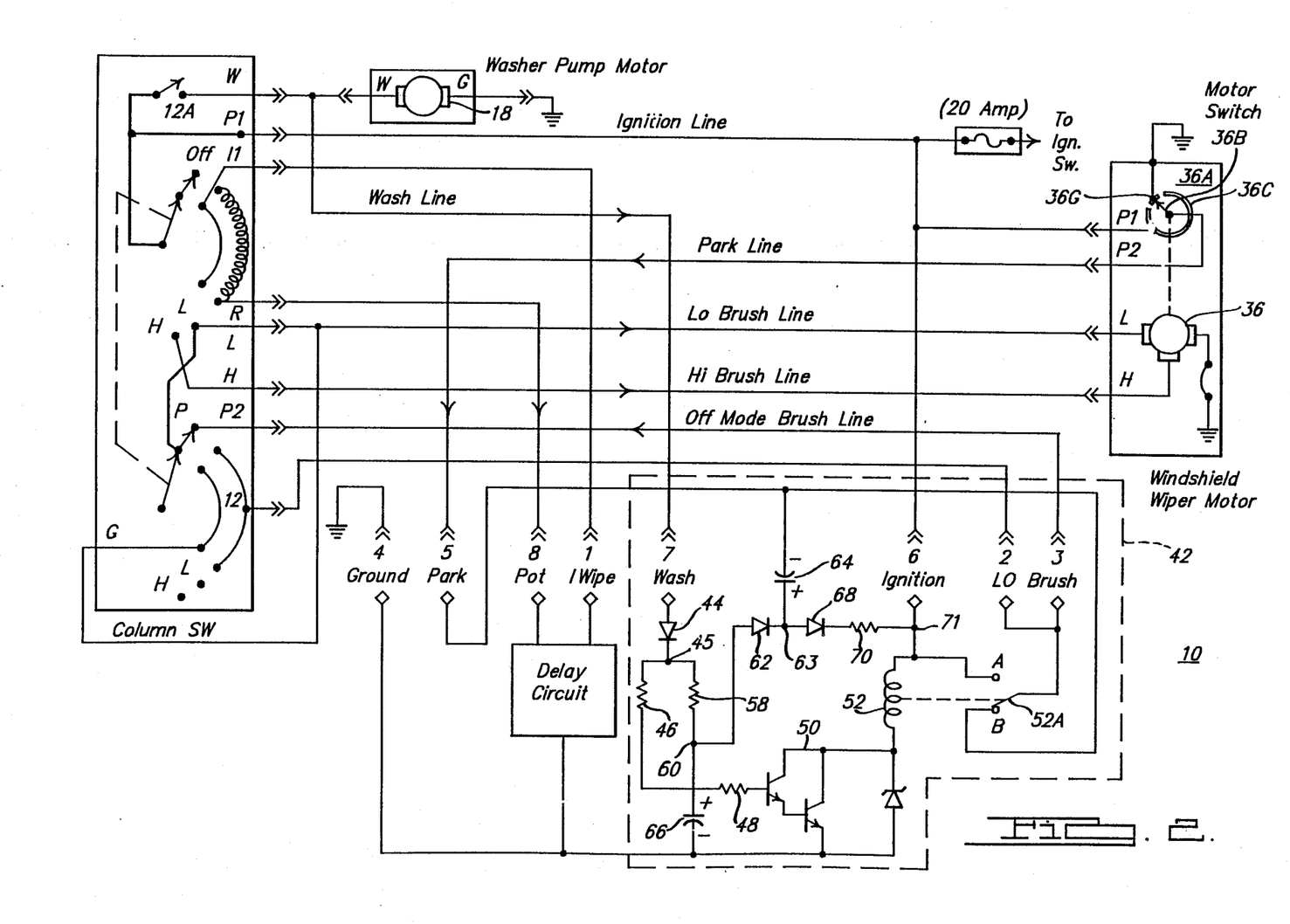
FIG. 2 depicts a schematic diagram of the wash circuit integrated in a wiper control system.
Figure 4:
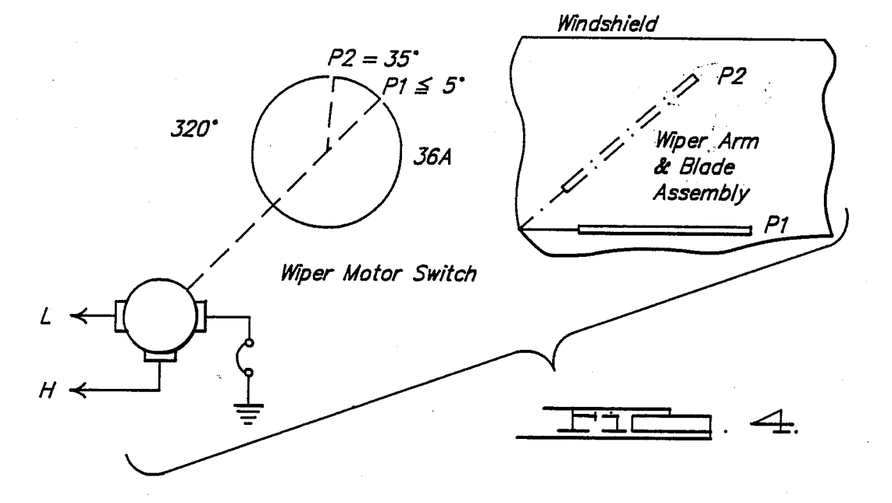
FIG. 4 illustrates the relationship between the wiper blade and the wiper motor switch with respect to an absolute park storage position P1 and a range of park positions up to a park position P2.

Mechanically connected to the rotor of wiper motor 36, a motor switch 36A, best illustrated in FIGS. 2 and 4, mechanically and electrically track the movement of the wiper arm and blade assemblies. When the wiper arm and blade assemblies find the park position 32 of FIG. 1, or locates between P1 and P2 as in FIG. 4, a ground signal from motor switch 36A routes to wiper control unit 42. Movement of the wiper arm and blade assemblies away from the park position generates an ignition voltage level signal from motor switch 36A to unit 42 over a park switch interconnection line. Both voltage level signals provide a wiper blade tracking signal to unit 42. The wiper control unit 42 provides timing and control signals using the tracking signals for controlling the operation of the wiper arm and blade assemblies during the OFF mode and the intermittent wiper delay modes. Unit 42 has a novel circuit, the subject of this invention, which permits automatic wipe of windshield 26 during the four modes when the wash pushbutton 12A is held pressed and an automatic wipe-after-wash circuit that operates after releasing pushbutton 12A that provides a plurality of wipe cycles prior to placing the wipers in an absolute park storage position P1.

OFF MODE CONDITIONS

The Rest State

The off-mode includes three states; namely, OFF (resting), pulse wipe/wash, and automatic wipe-after-wash. The OFF or resting state occurs with the ignition switch either OFF or ON and the wipe arm and blade assembly 28 in the park position storage 32. No activation of the wiper motor 36, nor washing nor wiping of the windshield occurs.

Pulse Wipe/Wash State

In the OFF mode, the pulse wipe/wash state starts by pressing and holding pressed the wash pushbutton switch 12A with the ignition switch on. In this state, the wash pump 18 and the windshield wiper motor 36 activate simultaneously (best seen in FIG. 2). Both the wiper arm and blade assemblies 28 will sweep across the surface of the windshield 26 to wipe from the surface water or washer fluid pumped from the reservoir 20 of FIG. 1 directed to the windshield through nozzles 24-24. The motor 36 of FIG. 2 operates continuously and the pump 18 pumps continuously as long as pushbutton 12A remains pressed.

With reference to FIGS. 1 and 2, upon pressing the wash pushbutton 12A, pump 18 immediately pumps fluid from the reservoir 20 onto the windshield 26 since pushbutton 12A applies ignition voltage directly to the pump. Switch 12A also applies ignition voltage over the wash interconnection line between switch 12A and the column switch to the wash terminal 7 of the control unit 42. Ignition voltage applied directly to terminal 7 causes an armature of a suitable single pole double throw (SPDT) relay 52 to pull in moving wiper 52A into contact with the normally open "A" contact which routes ignition voltage out of brush terminal 3 of control unit 42 over to the column switch 12 to terminal P2. This ignition voltage leaves column switch 12 via terminal "L" and travels over the low brush interconnection line to the low brush of windshield wiper motor 36. The POT terminal 8 and IWIPE terminal 1, not used for this operation, are electrically floating.

Relay 52 stays energized during this pulse wipe/wash state as long as the drive circuit to NPN Darlington transistor 50 conducts clamping a first end of the armature of relay 52 to ground. Holding pushbutton 12A pressed keeps transistor 50 conducting. The ignition voltage which routes through wash terminal 7 of unit 42 to forward bias a conventional switching type diode 44 and then to pull junction 45 near the ignition voltage. At junction 45, the diode current splits and travels along two paths. A first path routes the diode current through resistors 46 and 48 to provide enough base current to saturate transistor 50. Upon receipt of the base current, transistor 50 conducts, energizing relay 52 which, in turn, via contact "A" routes ignition voltage from ignition terminal 6 out of unit 42 via brush terminal 3 and over to column switch 12 through the brush interconnection line to terminal P2 and then over the low brush interconnection line to the LOW brush or L terminal of motor 36.

When wiper motor 36 operates, a shaft of the motor drives a lever arm 36B of a motor switch 36A across from an approximately 30 degree circular ground post 36G containing P1 and P2 to an approximately 325 degree circular motor switch ignition voltage post 36C. Lever arm 36B primarily monitors the wiper blade movement from about the park position storage location (when on the 30 degree ground post) and during a two-stroke wipe cycle, forward or up and then return or down across the windshield of the vehicle (during the 325 degree excursion over the 325 degree motor switch voltage post). A park voltage equivalent to the ignition voltage routes over a park interconnection line connecting the lever arm 36B to the park terminal 5 of the control unit 42. However, prior to the time the lever arm 36B moves from the ground post 36G to the park voltage post 36C, the diode current at junction 45 which routes through resistor 58 of a value illustratively of 1.8 kilohms to junction 60 and commence charging capacitors 66 and 64 exponentially, capacitor 64 being charged through diode 62. Capacitor 64 has a smaller capacity than capacitor 66, illustratively 6.0 mf and 15 mf respectively. However, capacitor 64 charges up to a value near the ignition voltage at the same time capacitor 66 reaches a similar voltage level.

When lever arm 36B of motor switch 36A moves off of ground post 36G and contacts the park voltage post 36C, the negative polarity terminal of capacitor 64 abruptly receives the ignition voltage. Hence, the voltage at the plus polarity terminal of capacitor 64 jumps or pulses immediately to a voltage level equivalent to the charge voltage of capacitor 64 plus the ignition voltage applied to the negative terminal. Hence, current flows from junction 63 through forward biased diode 68 and resistor 70 to junction 71 allowing capacitor 64 to exponentially discharge, lowering the voltage at junction 63, the reversed biased cathode of diode 62 impeding current towards junction 60. When parity of voltage levels at the two junctions 63 and 71 occurs, the current from capacitor 64 will cease. Since junction 63 reaches a higher voltage level than junction 60, at least one diode drop higher, capacitor 66 holds the voltage stored on the (+) polarity terminal and remains charged.

AUTOMATIC WIPE STATE

Upon release of the wash pushbutton 12A, the automatic wipe state occurs. The wash pump motor 18 ceases to pump wash fluid and the wiper arm and blade assemblies 28 go through several wiping cycles of the windshield before the wiper arm and blade assemblies return to the absolute park position storage P1.

To achieve this automatic wipe state, releasing pushbutton 12A disconnects the ignition voltage going to the wash terminal 7 of control unit 42. Hence, the diode current through forward biased diode 44 ceases. With the diode current removed, the drive circuit for transistor 50 must receive power from another source. To keep transistor 50 conducting, the (+) terminal of capacitor 66, in turn, starts to discharge exponentially such that the stored voltage produces a current that routes from the (+) terminal of capacitor 66 through resistors 58 and 46 to supply base biased current through resistor 48 to transistor 50 keeping it conducting. With transistor 50 conducting, relay 52 remains energized. Hence, motor 36 continues to operate at low speed. When the lever arm 36B of motor switch 36A returns to the circular ground post 36G, the park voltage abruptly goes from the ignition voltage level to ground causing park terminal 5 of control unit 42 to go to ground. With the park terminal 5 at ground, the (+) terminal of capacitor 64 again attempts to charge up exponentially in response to the voltage being exponentially discharged from capacitor 66. The current from capacitor 66, at slightly reduced voltage levels, routes through junction 60 and conducting diode 62 to the (+) terminal of capacitor 64 while the lever arm 36B remains on the ground post 36G of motor switch 36A. The (+) terminal of capacitor 64 charges up exponentially to the voltage level near that of the reduced voltage capacity of capacitor 66 and holds it until the motor switch 36A issues the ignition voltage signal.

When lever arm 36B again abruptly returns to the park voltage post 36C to generate the park voltage on the park interconnection line going to park terminal 5 of control unit 42 to again abruptly apply ignition voltage to the (−) terminal of capacitor 64, the voltage on the (+) terminal of capacitor 64 again discharges exponentially. The capacitor current from capacitor 66 discharges by an amount slightly lower than the current transferred previously to capacitor 64. Yet capacitor 66 continues to feed base bias current through resistors 58, 46 and 48 to transistor 50 maintaining relay 52 energized.

When the voltage on capacitor 66 reaches the stage where it can no longer provide enough base current to keep transistor 50 saturated, transistor 50 cuts off de-energizing relay 52. This causes wiper 52A to go to contact "B" to divert ignition voltage coming into control unit 42 via park terminal 5 to leave control unit 42 through brush terminal 3 and go over the OFF mode brush line into terminal P2 of the column switch 12. The ignition voltage then goes out of the column switch over the low brush line into the low brush terminal of motor 36 causing motor 36 to rotate until the motor switch lever arm 36B reaches the ground posts 36G to dynamically brake motor 36 placing the wiper arm and blade assembly 28 into the park position storage 32 at position P1.

OPERATION OF THE SYSTEM

Figure 3:
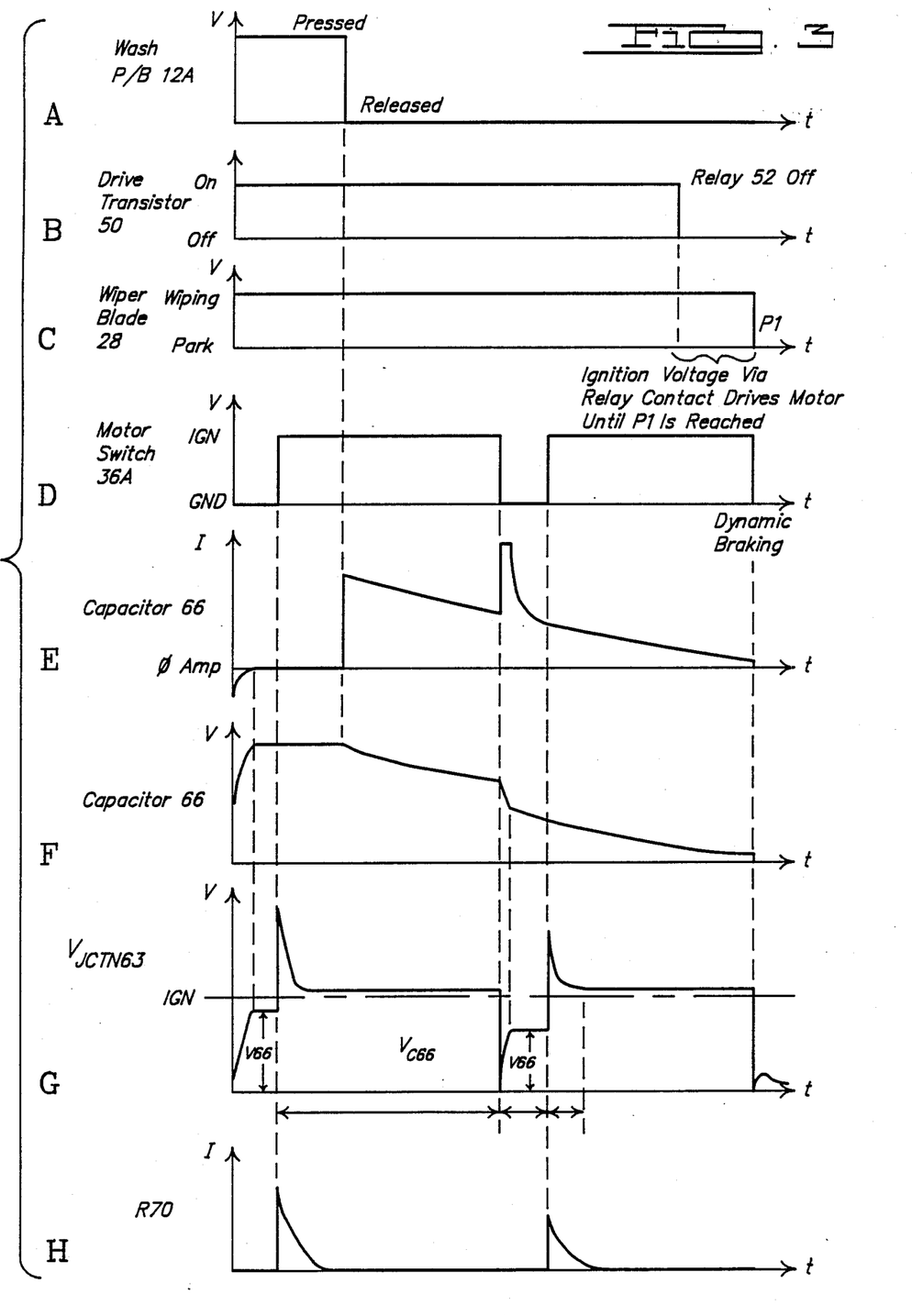

Referring now to FIG. 3-A through H in conjunction with FIG. 2, upon turning on the ignition switch and pressing wash pushbutton 12A, a step pulse is initiated which activates the pulse wipe/wash state. The wash pump 18 continues to pump washer fluid until pushbutton 12A is released. While pressing pushbutton 12, the drive transistor 50 conducts as illustrated in FIG. 3-B and the wiper arm and blade assemblies operate as shown in FIG. 3-C.

FIG. 3-E through H depict the charging and discharging of capacitors 64 and 66 in response to the step waveforms of the motor switch 36A depicted in FIG. 3-D. As shown in FIG. 3-F and G, capacitors 66 and 64 charge up exponentially to a voltage level equal to approximately the ignition voltage. FIG. 3-G depicts the voltage seen at junction 63 that connects to the (+) terminal of capacitor 64. These capacitors stay at this voltage level while the pushbutton 12A is pressed and while the motor switch 36A provides a ground level signal to unit 42. When the motor switch 36A abruptly switches from ground to the ignition voltage, as shown in FIG. 3-D, the voltage at the plus polarity terminal of capacitor 64 jumps immediately to a voltage equivalent to the charge voltage of the capacitor 66 plus the ignition voltage as illustrated in FIG. 3-G. The current through capacitor 66 stays at zero until the pushbutton 12A is released as shown in FIG. 3-E.

As shown in FIG. 3H, the current through resistor 70 also exhibits a spike and then exponentially decays to zero when the motor switch 36A output signal changes from ground to ignition.

As shown in FIG. 3-A, when the wash pushbutton 12A is released, ignition voltage is no longer supplied to the wash terminal 7 of unit 42. Hence, base current to transistor 50 must be received from some other source in order to keep the armature of relay 52 energized. Capacitor 66 becomes the sole source for providing base current to transistor 50 by providing current to resistors 58, 46 and 48 to keep transistor 50 conducting. Also, from junction 60 of FIG. 2, current from capacitor 66 routes through diode 62 to the (+) terminal of capacitor 64 to again charge capacitor 64 exponentially when motor switch 36A provides the ground potential to unit 42. As capacitor 66 supplies current to capacitor 64 and transistor 50, a descending staircase waveform is formed. When motor switch 36A provides the ignition voltage again, capacitor 64 again jumps to a potential at the (+) terminal equal to that of ignition voltage plus the charge placed on the (+) terminal by capacitor 66. This cycle continues as long as capacitor 66 can supply enough current to maintain the base current to transistor 50 and to recharge capacitor 64. As illustrated in FIG. 3-F, the voltage of capacitor 66 forms a descending staircase waveform with the falling edges decreasing in height for each step.

When capacitor 66 can no longer supply a charging current to capacitor 64, the voltage on capacitor 64 drops to zero when the motor switch 36A output signal goes to ground and then attempts to again exponentially charge up towards the voltage on capacitor 66. But since capacitor 66 can no longer supply current to the (+) terminal of capacitor 64, a small rise and fall exponential waveform generates a slight voltage pulse on capacitor 64 before the voltage returns to zero and terminates as indicated in FIG. 3-G.

Figure 5A:
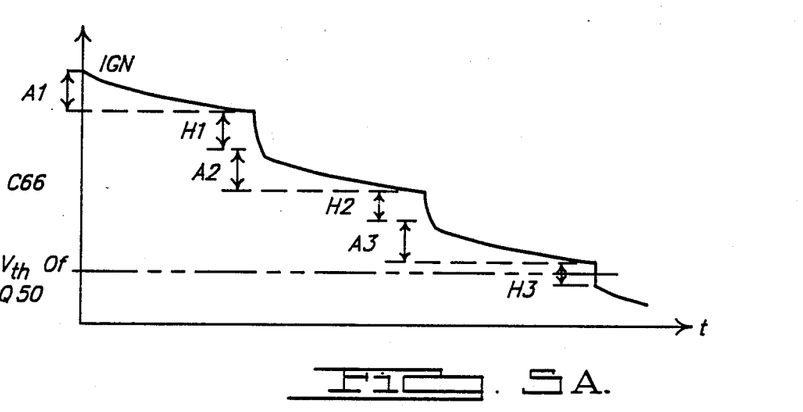
FIGS. 5A depicts an exponentially decaying staircase waveform of the voltage of capacitor 66 within a step-down circuit of this invention.
Figure 5B:
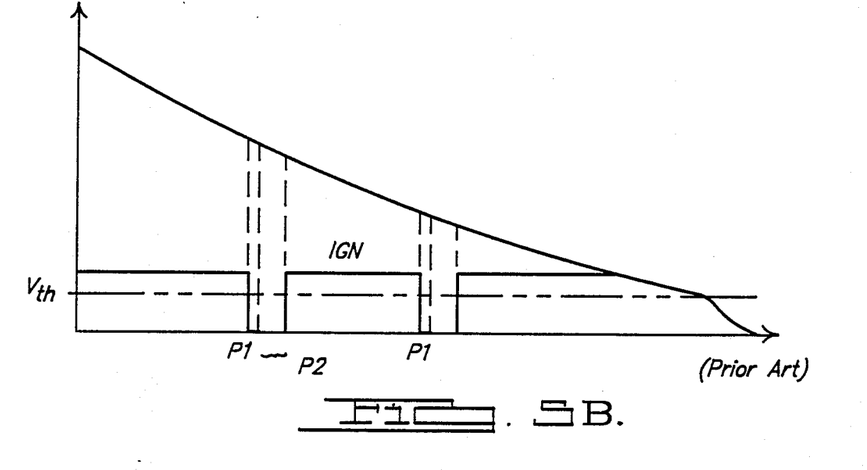
FIG. 5B depicts a prior art waveform of the voltage of capacitor 60 without the step-down circuit.

A desirable feature of this invention returns the wiper arm and blade assemblies 28 to the absolute park position substantially each time the base bias voltage of transistor 50 drops below the turn-on threshold level deenergizing relay 52. However, the probability of this occurring in prior art systems not employing the step-down circuit of the present invention is about 89%. The probability of the motor switch wiper 36B reaching the P2 region after transistor 50 turns off, indicative of the wiper blades being visible to the operator, stands at about 11% in the prior art systems. In the present system, the probability of the blades returning to the absolute park position stands at about 96%. These probability factors are depicted in FIGS. 5A and 5B. But, before explaining these Figures, an explanation of the probability equations (1) through (6) is in order.

$$100\% = P_{p1} + P_{p2} + P_{IGN} \quad (1)$$

$$P_{p2} + P_{IGN} = P_A = \frac{\sum_{i=1}^{x} A_1}{IGN - A_{th}} \approx \frac{7}{13} \approx 54\% \quad (2)$$

$$P_{p1} = \frac{\sum_{i=1}^{x} H_1}{IGN - V_{th}} \approx \frac{6}{13} \approx 46\% \quad (3)$$

$$\frac{P_{p2}}{P_{IGN}} = \frac{35°}{320°} \approx 0.11 \approx 11\% \quad (4)$$

$$P_{sp1} = P_{p1} + P_{IGN} \approx 95.5\% \quad (5)$$

$$P_{sp2} = P_{p2} = 4.5\% \quad (6)$$

Equation 1 indicates the three (3) possible positions of the motor switch that might become a factor in parking the wiper blades in the absolute park position. The most desirable position for the motor switch wiper arm 36B when transistor 50 turns off and relay 52 deenergizes is at P1. The next most desirable position for the motor switch wiper arm 36B would be along the circular ignition voltage post 36C since, upon deenergization of relay 52, the normally closed "B" contact of relay 52 will divert ignition voltage to the wiper motor 36 for a period long enough to cause the motor switch wiper arm 36B to rotate to P1.

The least desirable position for the wiper arm 36B is along ground post 36G and approaching P2. This position would place the wiper blades on the windshield in view of the operator.

Equation (1) expresses that the sum total of the probabilities of these wiper arm 36B positions occurring is 100% Equation (2) expresses the probability of relay 52 de-energizing the wiper arm at a time when the wiper arm 36B is not at P1 as being, illustratively 54%. While equation (3) expresses the probability of the wiper arm ending up at the absolute park position initially at 46%. Equation (4) expresses the action of probabilities between P2 territory and ignition voltage territory of the motor switch when the probability of P1 expressed in Equation (3) becomes a factor. When the step-down circuit of this invention is employed, the probability of the wiper blades stopping in the P1 region increases. The ratio of P2 to $P_{IGN}$ is approximately 11%. Equation (5) (which results from solving equations 2, 3 and 4) expresses the probability of the wiper arm 36B stopping at P1 as 95.5%; while equation (6) (resulting from solving equations 1 and 5) expresses the probability of the wiper arm stopping at P2 as 4.5%.

With these expressions available, when referring to FIG. 5A, the terms of equation (2) become readily apparent. The summation of the slow decaying exponential portions (A) of the voltage waveform with respect to the ignition voltage minus the threshold voltage of transistor 50 provides a probability figure of relay 52 de-energizing when the motor switch wiper arm 36B is at a location other than P1. Likewise, for equation (3), the summation of the abrupt exponential portions (H) of the waveform with respect to the same denominator provides a probability figure representative of the wiper arm ending up at the absolute park position.

In the present invention, equation (3) is a significant factor. If the step-down circuit of this invention was not in use, when transistor 50 cuts off, there is about a 89% chance that the wiper arm would stop initially at P1 as supported by FIG. 5B. With the step-down circuit present, the chance of stopping initially at P1 increases significantly to about 96% and the probability factor of P1 contributes to the expression represented by equation (5).

Figure 6:
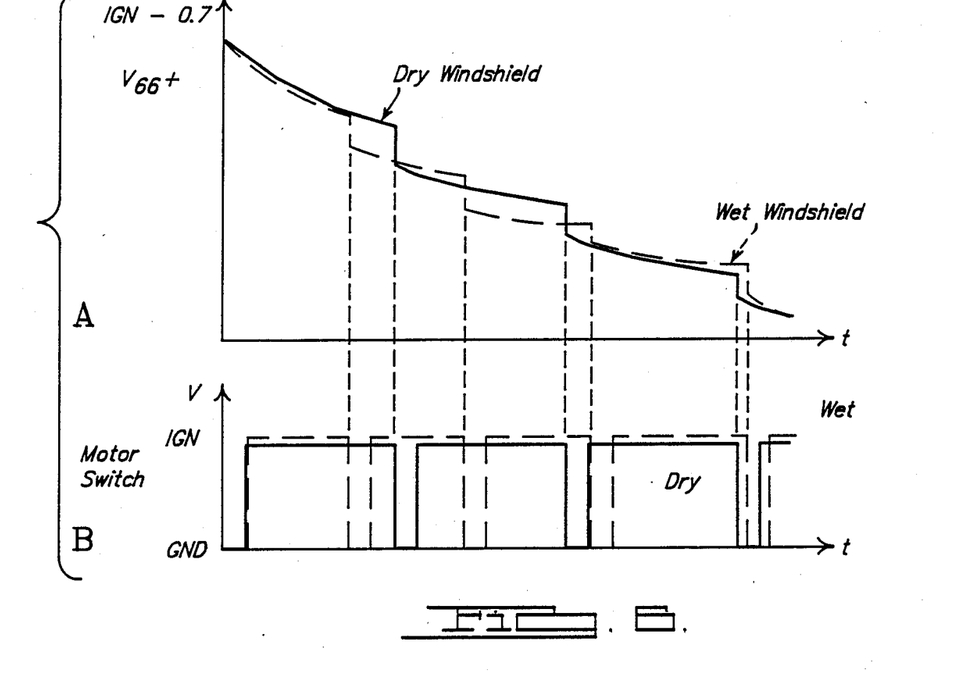

Referring now to FIG. 6-A and B, in FIG. 6-A, the declining staircase voltage of capacitor 66 is depicted for conditions when the windshield is dry (solid line) and when the windshield is wet (dash line). FIG. 6-B depicts the timing of the motor switch for the dry and wet conditions of the windshield wiper. Note that the duration of the steps of the voltage waveform for capacitor 66 is longer when the windshield is dry and shorter when the windshield is wet. Consequently, the pulse repetition period of the motor switch waveform is shorter when the windshield is wet than when it is dry.

Figure 7:
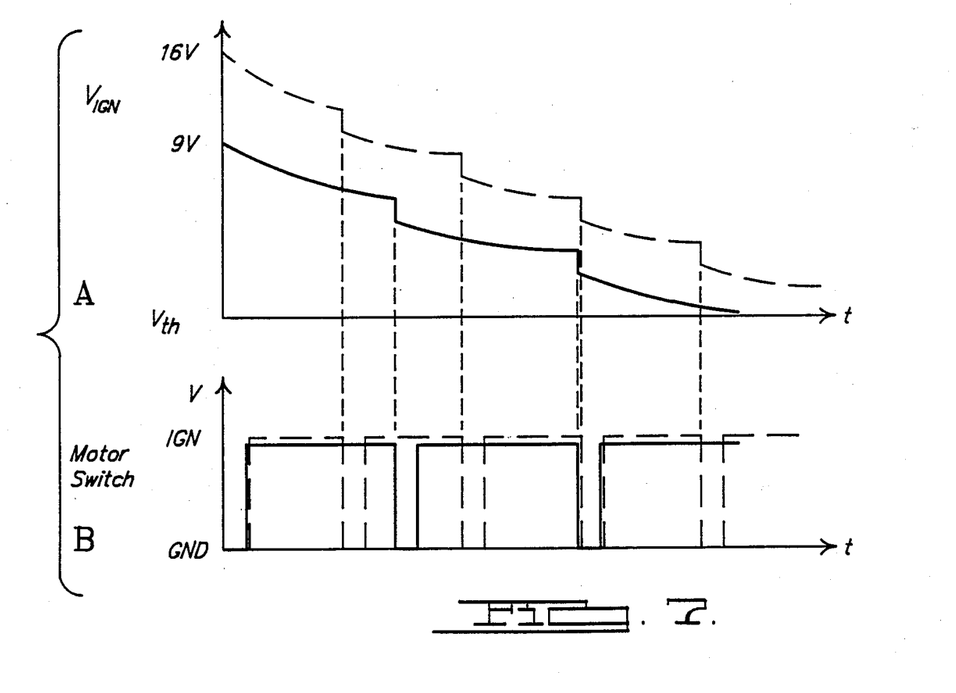

FIG. 7-A depicts the changes in the capacitor 66 voltage when the ignition voltage varies from 9 volts up to 16 volts. When the ignition voltage is around 16 volts (dash line), the pulse repetition period of the motor switch waveform is shorter than when the ignition voltage is around 9 volts (solid line). FIG. 7-B depicts the reaction of the motor switch 36A for the two different voltage levels. Even under these diverse environmental and system variations, the high probability of parking the wiper arm and blade assemblies at the absolute park condition remains.

It is to be understood that the above-described embodiment is mainly illustrated of the principles of the invention. Although a discrete embodiment is disclosed, an integrated embodiment equivalent could also be developed. One skilled in the art may make changes and modifications to the embodiments disclosed herein and may devise other embodiments without the departing from the scope and essential characteristics thereof.

What is claimed is:

1. In a windshield wash and wipe system responsive to any of a plurality of wash and wipe conditions, in combination comprising:
    (a) switch means having an input for receiving a source voltage and producing therefrom at an output terminal a pulse signal of the same polarity as that of the source voltage and of a chosen duration;
    (b) windshield wash means adapted to receive the pulse signal and in response to the pulse signal, to supply wash fluid to the windshield;
    (c) windshield wipe control means having a first input terminal for receiving the pulse signal, a second input terminal for receiving the source voltage and a third input terminal for receiving a square-wave voltage signal from a motor switch mechanically coupled to a wiper motor, the motor switch providing digital voltage signals in response to movement of a rotor of the wiper motor, and producing therefrom at an output terminal the source voltage from a drive circuit of the control means for energizing the wiper motor which in turn moves a wiper arm and blade assembly back and forth across the windshield to perform the wiping action while the pulse signal is present, and then upon termination of the pulse signal to continue to supply the source voltage to the wiper motor under the control of a step-down voltage circuit within said control means that applies to an input of said drive circuit, the step-down voltage circuit being used to develop a voltage waveform of a chosen format used to turn off the drive circuit during a chosen portion of the waveform, the turning off of the drive circuit occurring in a manner that opposes parking the wiper arm and blade assembly at a position other than at an absolute park position of the windshield out of the vision of an operator.

2. The system as defined in claim 1 wherein the chosen format of the voltage waveform is a descending stair-case voltage waveform signal used as an input signal to said drive circuit after the pulse signal terminates.

3. The system as defined in claim 2 wherein the drive circuit is a solid state drive device, having a turn-on voltage threshold level, used in conjunction with a relay-type switch means, the relay-type switch means being used to apply the source voltage to the wiper motor, the drive circuit cutting off the relay-type switch means and the source voltage to the wiper motor when the staircase voltage waveform signal descends below the threshold level.

4. The system as defined in claim 3 wherein a falling edge of the staircase voltage waveform signal crosses the threshold level in a manner that increases the probability of stopping the source voltage applied to the wiper motor in a manner that positions the wiper arm and blade assembly in the absolute park position.

5. The system as defined in claim 4 wherein the motor switch is used in conjunction with said relay-type switch means to supply the source voltage to the wiper motor, even after the staircase voltage waveform signal goes below the threshold voltage level, until the rotor of the motor brings the wiper arm and blade assembly to the absolute park position.

6. The system as defined in claim 2 wherein the step-down voltage circuit for developing the descending stair-case voltage waveform signal includes a voltage storage device used in a current delay circuit which interacts with a current depletion circuit, said current depletion circuit reacting to deplete the voltage from said storage device in response to the square-wave voltage signal from the motor switch.

7. An independent wash and wipe after wash circuit usable in a windshield wiper system that provides Off, continuous (high or low speed) and intermittent wipe modes of operations by way of a mode select switch, for controlling a wash fluid pump motor and operating a high current wiper motor simultaneously during a manually actuated operation of the circuit, said circuit also providing for automatic control of the wiper motor after ceasing the manual actuated operation in a manner that renders a plurality of oscillations of a wiper arm and blade assembly, which mechanically couples to a rotor of the wiper motor, before ceasing operation and storing the wiper arm and blade assembly in a park storage position, the wiper motor having a motor switch also mechanically coupled to the rotor of the wiper motor for providing digital signals at an output terminal indicative of the position of the rotor and of the wiper arm and blade assembly, said circuit comprising:

(a) an actuating switch means adapted to receive a source voltage signal of a voltage source and during actuation, providing a pulse signal at an output terminal of the same polarity as that of the voltage source for a duration dictated by an actuation period;

(b) a windshield wash means having an input terminal coupled to said actuating switch means for receiving said pulse signal and producing therefrom at output nozzles a continuous spray of windshield wash fluid during the presence of the pulse signal;

(c) a wiper motor control means having a first input terminal coupled to said actuating switch means for receiving the pulse signal, a second input terminal coupled to receive the source voltage signal and a third input terminal adapted to receive the digital signals from the motor switch, and providing at an output terminal the source voltage signal to the wiper motor during the presence of the pulse signal and after termination of the pulse signal, providing the source voltage signal to the wiper motor under the control of an automatically generated step-down drive voltage signal for a chosen period of time before causing the wiper motor to position the wiper arm and blade assembly in the park storage position.

8. The circuit as in claim 7 wherein the wiper motor control means includes:

(a) a single-pole, double-throw, relay type switch means connected to the input of the wiper motor for applying the source voltage signal to the wiper motor during the presence of the pulse signal and the automatically generated stepdown drive voltage signal;

(b) a semiconductor drive means connected to an input of the relay type switch means for activating the relay type switch means, said drive means having a turn-on voltage threshold level that is responsive to the stepdown drive voltage signal, the drive means being cutoff when the stepdown drive voltage signal descends below the threshold level; and (c) a step-down voltage circuit connected to an input of the drive means for generating step-down drive voltage signal.

9. The circuit of claim 8 wherein the step-down drive voltage signal is a descending staircase voltage waveform signal.

10. The circuit of claim 9 wherein the step-down voltage circuit includes:

(a) a voltage storage means coupled to receive said pulse signal and upon termination of the pulse signal, to provide current sufficient for maintaining the input voltage to said drive means above the voltage threshold level keeping the drive means conducting, and (b) a current depletion means coupled between a source voltage input terminal, a digital input signal terminal and an interface of the voltage storage means with the drive means for draining input current to the drive means at chosen intervals such that the voltage to the drive means becomes said descending staircase voltage waveform signal.

11. The circuit as in claim 10 wherein said current depletion means drains current from the drive means such that after a chosen number of oscillations of the wiper arm and blade assembly, the drive means cuts off in a manner that opposes parking the wiper arm and blade assembly at a position other than at an absolute park position of the windshield out of the vision of an operator.

12. The circuit as in claim 11 wherein a falling edge of the staircase voltage signal crosses the threshold level of the of the drive means at a point in time that increases the probability of stopping the source voltage to the wiper motor in a manner that positions the wiper arm and blade assembly in the absolute park position.

13. The circuit as in claim 12 wherein the motor switch is used in conjunction with said relay type switch means to supply source voltage to the wiper motor even after the staircase voltage waveform signal goes below the threshold voltage level until the rotor of the motor brings the wiper arm and blade assembly to the absolute park position.

* * * * *